(12) United States Patent
Otaka (10) Patent No.: US 9,557,944 B2
(45) Date of Patent: Jan. 31, 2017

(54) PRINTING SYSTEM INCLUDING A HOST APPARATUS, AND A PRINTING APPARATUS WHICH IS CONNECTED TO THE HOST APPARATUS FOR PERFORMING SECURE PRINTING WITH MISMATCHED AUTHENTICATION DATA

(71) Applicant: CANON KABUSHIKI KAISHA, Tokyo (JP)

(72) Inventor: Satoshi Otaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 14/562,603

(22) Filed: Dec. 5, 2014

(65) Prior Publication Data

US 2015/0178027 A1    Jun. 25, 2015

(30) Foreign Application Priority Data

Dec. 20, 2013 (JP) .................................. 2013-264496

(51) Int. Cl.
*G06F 3/12* (2006.01)
*G06K 15/00* (2006.01)

(52) U.S. Cl.
CPC .......... *G06F 3/1238* (2013.01); *G06F 3/1222* (2013.01); *G06F 3/1285* (2013.01)

(58) Field of Classification Search
CPC .... G06F 21/608; G06F 21/31; G06F 21/6209; G06F 21/6218; G06F 21/00; G06F 21/55; G06F 21/44; G06F 21/445; G06F 21/45; G06F 21/572; G06F 3/1238; G06F 3/1222; G06F 3/1204; G06F 3/123; G06F 3/1285; H04N 1/4406; H04N 1/4413; H04N 1/4433; H04N 1/32128; H04N 1/32144; H04N 1/44; H04N 1/00854; H04N 2201/3205
USPC ....... 358/1.13–1.15; 713/182, 164, 166, 172, 713/184, 185; 715/741; 726/2, 17, 21, 27, 28, 726/29, 30
See application file for complete search history.

(56) References Cited

U.S. PATENT DOCUMENTS

| | | | | | |
|---|---|---|---|---|---|
| 6,545,767 | B1 * | 4/2003 | Kuroyanagi | ..........  | G06F 21/608 358/1.1 |
| 7,130,066 | B1 * | 10/2006 | Kanematu | ..................... | 358/1.15 |
| 7,760,382 | B2 * | 7/2010 | Murata | ................... | G03G 21/02 358/1.14 |
| 7,817,291 | B2 * | 10/2010 | Ohmori | ............... | G03G 15/5066 340/5.53 |

(Continued)

FOREIGN PATENT DOCUMENTS

| | | |
|---|---|---|
| JP | 2004-252709 A | 9/2004 |
| JP | 2007-286957 A | 11/2007 |

*Primary Examiner* — Mohammad Ghayour
*Assistant Examiner* — Jonathan R Beckley
(74) *Attorney, Agent, or Firm* — Fitzpatrick, Cella, Harper & Scinto (57) ABSTRACT

When performing authenticated printing, an administrator must minutely grasp the consistency between account registered information held by a printer and account information input by each user, and this complicates an updating work. In addition, the user cannot perform printing if this updating work is not performed. In an embodiment of the present invention, therefore, the administrator sets a secondary identifier group updatable by a user, and the account registered information is automatically updated based on the account information input by the user.

24 Claims, 8 Drawing Sheets

(56) References Cited

U.S. PATENT DOCUMENTS

| | | | |
|---|---|---|---|
| 7,889,366 B2* | 2/2011 | Nishiyama | G06F 21/608 358/1.14 |
| 7,983,402 B2* | 7/2011 | Ohara et al. | 379/102.02 |
| 8,125,662 B2* | 2/2012 | Sugiyama | G06F 3/1222 358/1.13 |
| 8,132,230 B2* | 3/2012 | Akita | G06F 21/608 705/67 |
| 8,405,842 B2* | 3/2013 | Munetomo | 358/1.14 |
| 8,564,817 B2 | 10/2013 | Otaka | |
| 8,797,588 B2* | 8/2014 | Yamada | 358/1.17 |
| 8,842,307 B2* | 9/2014 | Maeda | 358/1.14 |
| 2007/0136820 A1* | 6/2007 | Saito | H04L 63/0807 726/27 |
| 2014/0007177 A1* | 1/2014 | Buck et al. | 726/1 |
| 2014/0282991 A1* | 9/2014 | Watanabe et al. | 726/9 |

* cited by examiner

| SECONDARY IDENTIFIER GROUP SETTING | ID NAME | USER 1 | USER 2 | USER 3 |
|---|---|---|---|---|
| × | USER ID | 11AA22BB | 33CC44DD | 55EE66FF |
| × | PW | xxyyzz | ppqqrr | llmmnn |
| ○ | DEPARTMENT ID | 0987 | 0987 | 0987 |

PRINTING SYSTEM INCLUDING A HOST APPARATUS, AND A PRINTING APPARATUS WHICH IS CONNECTED TO THE HOST APPARATUS FOR PERFORMING SECURE PRINTING WITH MISMATCHED AUTHENTICATION DATA

BACKGROUND OF THE INVENTION

Field of the Invention

The present invention relates to a printing system, a printing apparatus, and a control method of the printing apparatus, and particularly to a printing system which includes an authentication database and performs authenticated printing, and a printing apparatus included in the system and a control method of the printing apparatus.

Description of the Related Art

Conventionally, there is a printing system which performs authentication when performing printing for the purposes of, for example, accounting management, security management, and billing management of a printer. Such a system generally checks the consistency between account information input by the user and account registered information of a printer/authentication server. In this system, only a system administrator is responsible for updating the account registered information of the printer/authentication server from the viewpoint of security.

Accordingly, the system administrator must minutely check and grasp the consistency between each user and the account information, and this complicates the updating work by the system administrator. In addition, the user cannot perform printing unless the system administrator performs the updating work.

To eliminate the complicated work performed by the system administrator, techniques which allow users to update the account registered information have been proposed as described in Japanese Patent Laid-Open Nos. 2004-252709 and 2007-286957.

In these techniques proposed in Japanese Patent Laid-Open Nos. 2004-252709 and 2007-286957, the system administrator is released from the complexity of the account registered information updating work. Since, however, users can freely change the account registered information without intervention by the system administrator, the security problem remains unsolved.

In the conventional system, therefore, only the system administrator is responsible for updating the account registered information, or all users can freely update the account registered information as disclosed in Japanese Patent Laid-Open Nos. 2004-252709 and 2007-286957, that is, there is a choice between the two alternatives. Accordingly, demands have arisen for a system which maintains a balance between the degree of freedom of the update of the account registered information and the assurance of security.

SUMMARY OF THE INVENTION

Accordingly, the present invention is conceived as a response to the above-described disadvantages of the conventional art.

For example, a printing system, a printing apparatus, and a control method of the printing apparatus according to this invention are capable of reducing the account registered information updating work and assuring the security during authentication at the same time.

According to one aspect of the present invention, there is provided a printing system comprising a host apparatus which transmits a print job from a user and issues an instruction for authenticated printing, and a printing apparatus which is connected to the host apparatus, receives the print job and the instruction for authenticated printing, and performs authenticated printing. The printing apparatus comprises: a storage unit configured to store account registered information for each user input by an administrator of the printing system beforehand; an authentication unit configured to authenticate the user based on the instruction for authenticated printing; and an update unit configured to update, in a case where it is determined by authentication by the authentication unit that a portion of account information input by the user and a portion of the account registered information stored in the storage unit match and remaining portions do not match, the storage unit with respect to the remaining portions found to be mismatching portions, based on the account information input by the user.

The invention is particularly advantageous since the complexity of the account registered information updating work by an administrator can be reduced by updating a part of the account registered information by designation from a user.

Further features of the present invention will become apparent from the following description of exemplary embodiments (with reference to the attached drawings).

DESCRIPTION OF THE EMBODIMENTS

Exemplary embodiments of the present invention will now be described in detail in accordance with the accompanying drawings. Note that the same reference numerals denote already explained portions, and a repetitive explanation will be omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Figure 1:
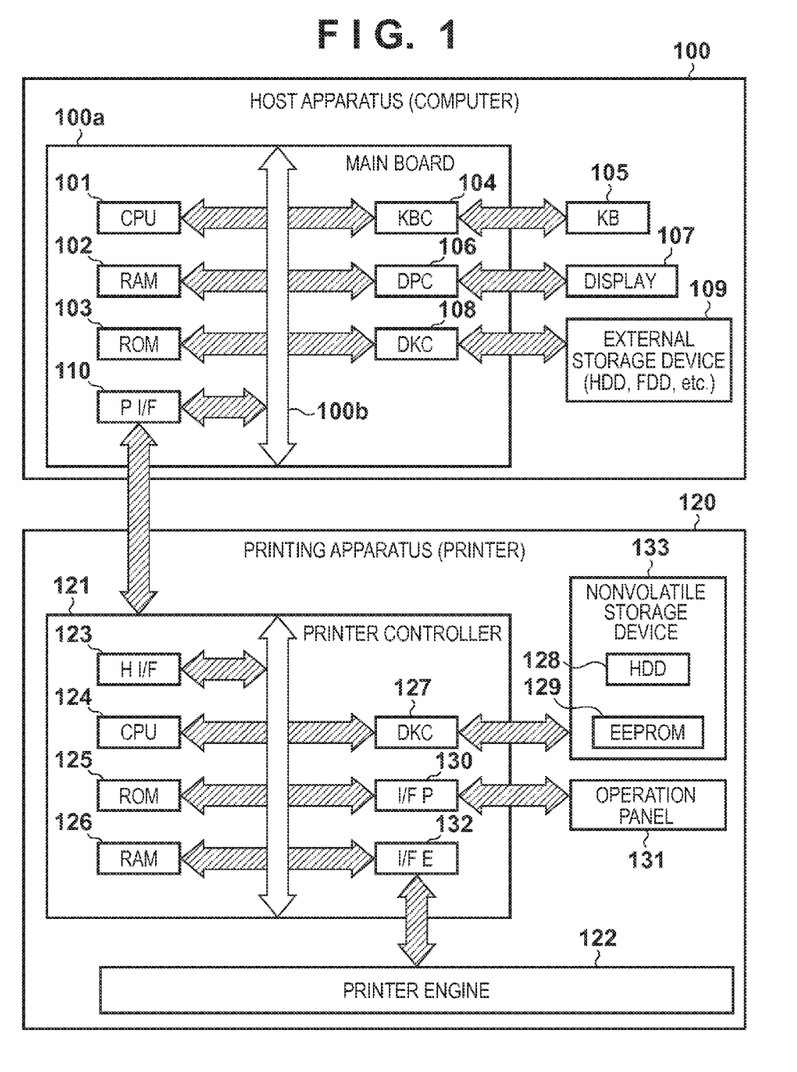
FIG. 1 is a block diagram showing an outline of the hardware configuration of a printing system as an exemplary embodiment of the present invention.

FIG. 1 is a block diagram showing an outline of the hardware configuration of a printing system as an exemplary embodiment of the present invention. As shown in FIG. 1, a printer (printing apparatus) 120 and a host apparatus 100 such as a computer are connected to each other via their respective interface circuits.

The host apparatus 100 includes a main board 100a, and peripheral devices such as a keyboard (KB) 105, display (DISPLAY) 107, and external storage device 109. The main board 100a includes a CPU 101, RAM 102, ROM 103, keyboard controller (KBC) 104, display controller (DPC) 106, disk controller (DKC) 108, and printer interface (P I/F) 110. The external storage device 109 includes a hard disk drive (HDD), floppy disk (FDD®), or the like.

The CPU 101 comprehensively controls the devices connected to a system bus 100b, and executes various programs. The keyboard controller (KBC) 104 controls inputs from the keyboard (KB) 105 and a pointing device (not shown). The display controller (DPC) 106 controls display of the display (DISPLAY) 107. The disk controller (DKC) 108 controls access to the external storage device 109 such as a hard disk drive (HDD) or floppy disk (FDD®).

The RAM 102 is used as a main memory or work area of the CPU 101. The ROM 103 stores, for example, programs for implementing various functions (to be described later), a boot program, various applications, user files, and a printer control command generation program (to be referred to as a printer driver hereinafter). The printer interface (P I/F) 110 controls a process of communicating data and commands with the printer 120 by using a predetermined bidirectional communication protocol.

The printer 120 includes a printer engine 122, printer controller 121, nonvolatile storage device 133, and operation panel 131. The printer 120 is connected to and communicates with the host apparatus 100 by using the predetermined bidirectional communication protocol. The nonvolatile storage device 133 includes a hard disk (HDD) 128 or EEPROM 129.

The printer controller 121 includes a CPU 124, ROM 125, RAM 126, host interface (H I/F) 123, disk controller (DKC) 127, panel interface (I/F P) 130, and engine interface (I/F E) 132.

The CPU 124 executes various programs. The ROM 125 receives data and commands from the host apparatus 100, and stores programs for implementing optimized printing by controlling the printer engine 122 and various kinds of data.

The RAM 126 temporarily stores various kinds of data and various programs. The host interface (H I/F) 123 controls the process of communicating data and commands with the host apparatus 100 by using the predetermined bidirectional communication protocol. The hard disk drive (HDD) 128 stores large-volume data such as print data and information on the print data from the host apparatus 100. The EEPROM 129 stores, for example, information unique to a printer to be used in printing. The disk controller (DKC) 127 controls access to the nonvolatile storage device 133. The panel interface (I/F P) 130 controls the display and input of the operation panel 131. The engine interface (I/F E) 132 controls the printer engine 122 which implements optimized printing by directly controlling the hardware.

The printer engine 122 is a mechanism which performs optimized printing by directly controlling the hardware, and is a printer engine adopting an inkjet method or electrophotographic method.

Figure 2:
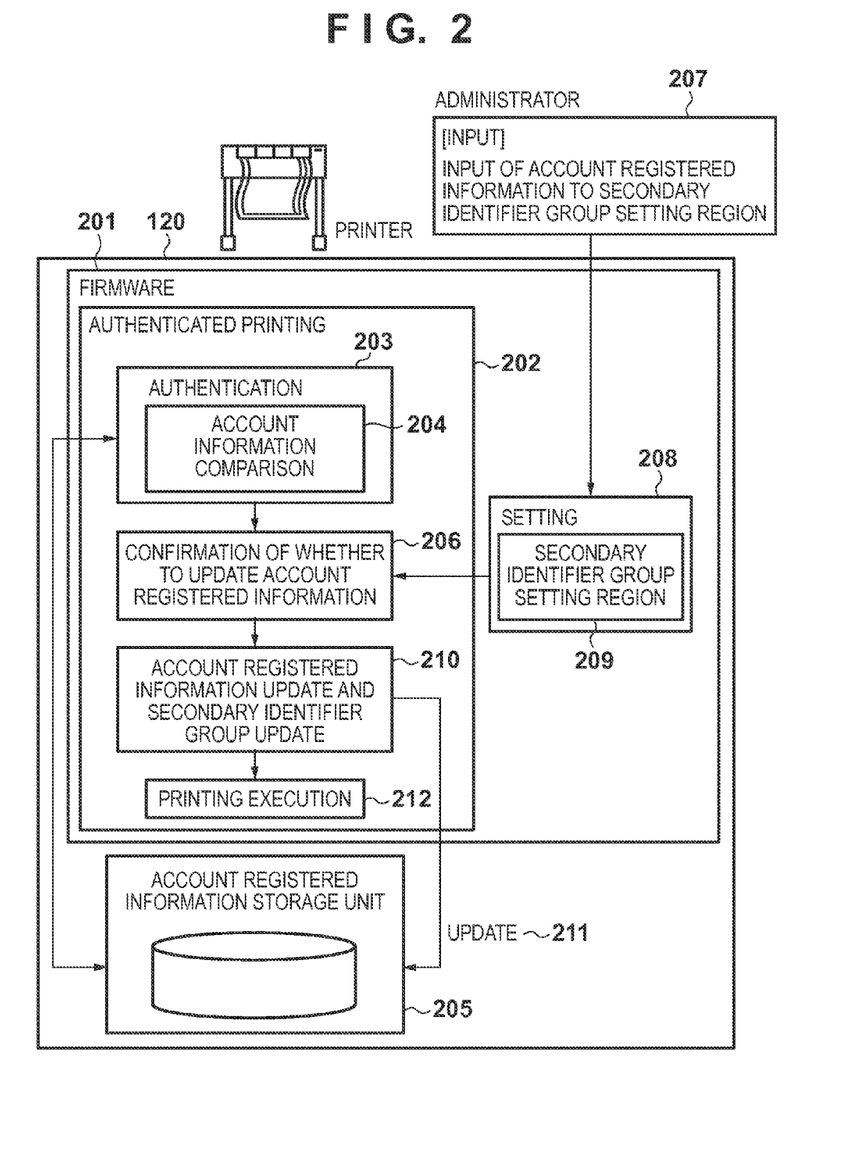
FIG. 2 is a block diagram showing the functional configuration of account registered information update performed by the printing system shown in FIG. 1.

FIG. 2 is a block diagram showing the functional configuration of account registered information update performed by the printing system shown in FIG. 1.

The printer 120 is, for example, a large-format printer using a print medium such as A0 or B0-size printing paper, or roll paper for printing an image of such a size. This large-format printer includes firmware 201 in which functions for account registered information update are implemented, and an account registered information storage unit 205.

The firmware 201 includes an authenticated printing unit 202. The authenticated printing unit 202 executes authenticated printing based on a print job and an instruction for authenticated printing transmitted from the host apparatus 100.

In authenticated printing, an authentication unit 203 first compares account information, that is, compares account information input by the user with account registered information held in the account registered information storage unit 205 by the printer 120 (204). Subsequently, whether to update the account registered information is confirmed based on the comparison result (206). This confirmation is performed as follows. That is, the administrator inputs the account registered information to a secondary identifier group setting region 209 (207) and sets the information (208), and the information is stored in the account registered information storage unit 205. The confirmation is performed by referring to the set information.

After the confirmation, account registered information update is performed (210), the account registered information in the account registered information storage unit 205 is updated (211), and printing is executed (212).

Figure 3:
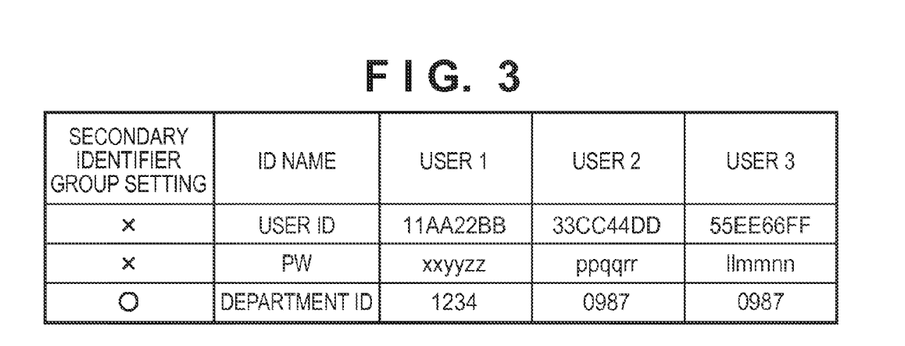
FIG. 3 is a view showing an example of account registered information in the form of a table.

FIG. 3 is a view showing an example of the account registered information in the form of a table.

In FIG. 3, a user ID, PW (PassWord), and department ID are set as an ID name. The administrator sets the department ID as the secondary identifier group. Also, three users, that is, user 1, user 2, and user 3 are registered as users, and the user ID, PW, and department ID are set for each user.

Of the account registered information and the account information input by the user in the instruction for authenticated printing, information updatable by only the administrator of the printing system is called a primary identifier group, and information updatable by both the administrator and user is called a secondary identifier group. The account registered information and account information are assigned to each user as information unique to the user. In the following embodiments, the user ID and PW (PassWord) are information belonging to the first identifier group and are updated by the administrator, and the department ID is information belonging to the secondary identifier group.

Several embodiments of account registered information update to be executed by the printing system having the above configuration will be explained below.

First Embodiment

Figure 4:
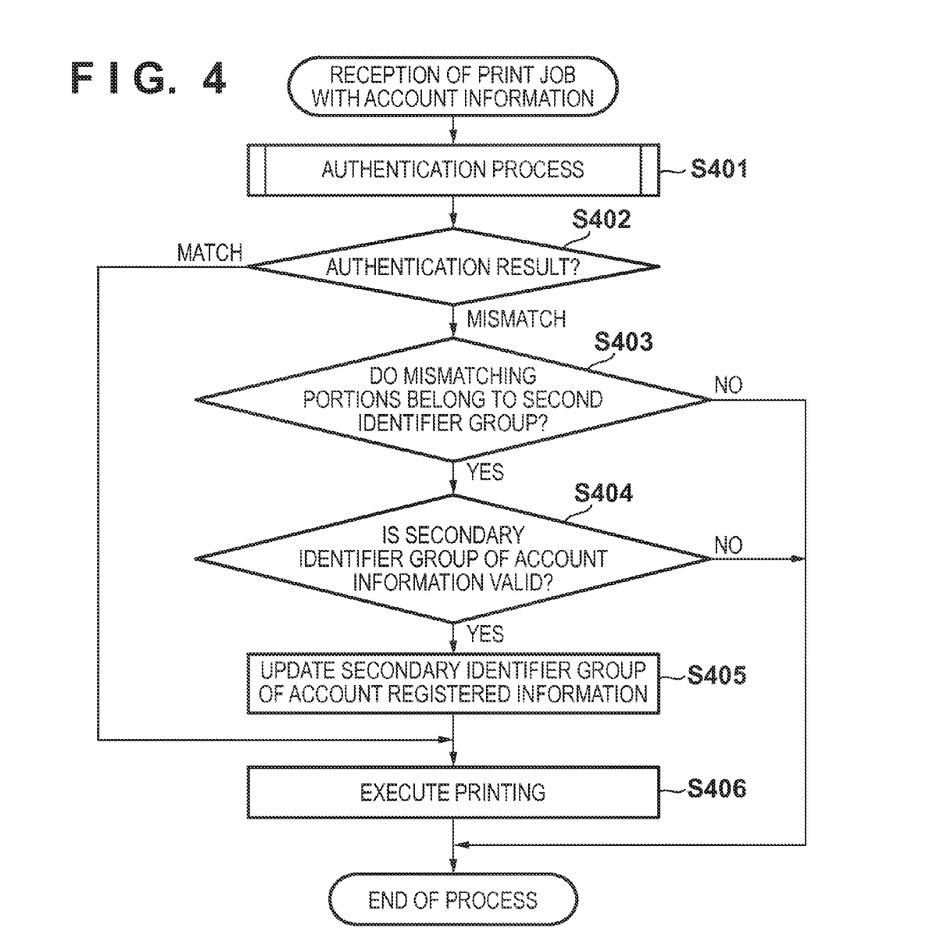
FIG. 4 is a flowchart showing an outline of an account registered information updating process according to the first embodiment.

FIG. 4 is a flowchart showing an outline of an account registered information updating process according to the first embodiment.

When the host apparatus 100 designates authenticated printing, the printer 120 receives a print job with account information from the host apparatus 100, executes an authentication process in step S401, and discriminates the authentication result in step S402.

Figure 5:
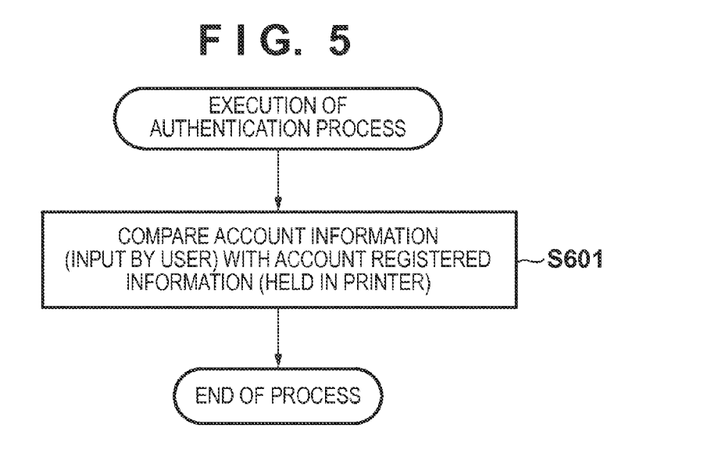
FIG. 5 is a flowchart showing an outline of an authentication process.

FIG. 5 is a flowchart showing an outline of the authentication process.

When the authentication process is performed, the account information input by the user is compared with the account registered information stored in the account registered information storage unit 205 in step S601.

If the authentication result indicates "match", that is, if all identifiers of the account information input by the user and the account registered information held in the account registered information storage unit 205 match, the process advances to step S406 to execute printing, and the process is terminated after that. According to the example shown in FIG. 3, this means that, when the user is user 1, all of "user ID: 11AA22BB", "PW: xxyyzz", and "department ID: 1234" input as the account information match.

On the other hand, if the authentication result indicates "mismatch", that is, if some or all identifiers of the account information input by the user and the account registered information held in the account registered information storage unit 205 do not match, the process advances to step S403. In step S403, whether or not an identifier found to be a mismatching identifier belongs to the secondary identifier group is determined. If this determination result is NO, that is, if the identifier found to be a mismatching identifier does not belong to the secondary identifier group, the process is immediately terminated. On the other hand, if the determination result is YES, that is, if the identifier found to be a mismatching identifier belongs to the secondary identifier group, the process advances to step S404.

In step S404, whether or not the secondary identifier group as a target has a valid value is determined. If the determination result is YES, that is, if the secondary identifier group has a valid value, the process advances to step S405 to update the account registered information. In the example shown in FIG. 3, the department ID is set as the secondary identifier group. For user 1, therefore, the department ID among "user ID: 11AA22BB", "PW: xxyyzz", and "department ID: 1234" input as the account information is a mismatching identifier. However, the value of this department ID means that a valid value (a valid department ID (for example, 0987)) is input. After the account registered information is updated in step S405, printing is executed in step S406, and the process is terminated after that.

Accordingly, even though a department to which the user belongs has changed and the user inputs a new department ID, printing can be executed if the department ID is already registered as the account registered information. If the department ID is not registered as the account registered information, no printing is permitted. Therefore, control can be performed so as not to perform printing if the user inputs an incorrect department ID.

Furthermore, if the department ID input by the user is already registered (YES in step S404), the account registered information is automatically updated by regarding the department ID as an identifier corresponding to the user (step S405). Accordingly, the user can perform the updating process without designating update by inputting the new department ID again.

On the other hand, if the determination result in step S404 is NO, that is, if the secondary identifier group as a target has an invalid value, the process is immediately terminated. Note that this valid/invalid determination in step S404 is to determine whether or not the department ID set as the secondary identifier group is an existing department ID in a printing system operation environment. If it is determined that the department ID is invalid, the user or administrator may also be notified of this information.

Figure 6:
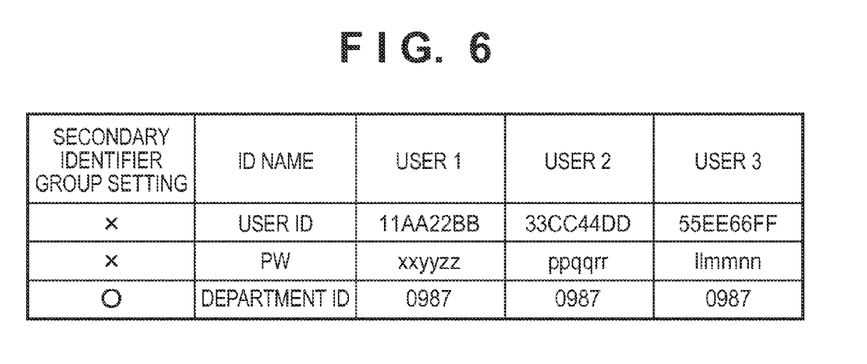
FIG. 6 is a view showing an example of updated account registered information.

FIG. 6 is a view showing an example of updated account registered information.

In this example shown in FIG. 6, the updated account information of user 1 contains "user ID: 11AA22BB", "PW: xxyyzz", and "department ID: 0987". This means that the department ID of the account registered information of user 1 is updated to "0987" in step S405.

Second Embodiment

Figure 7:
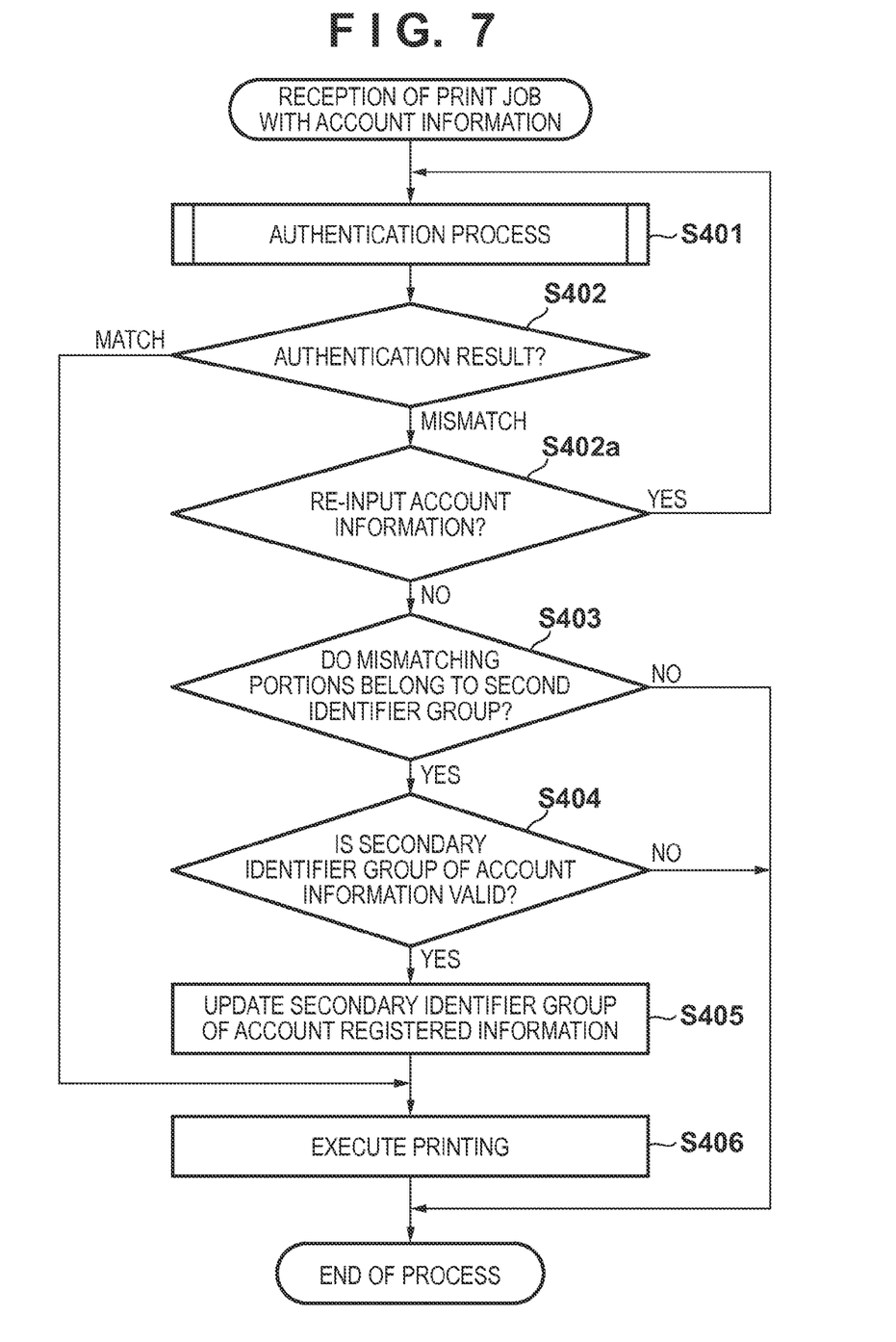
FIG. 7 is a flowchart showing an account registered information updating process according to the second embodiment.

FIG. 7 is a flowchart showing an account registered information updating process according to the second embodiment.

Note that in FIG. 7, the same processing steps as already explained with reference to FIG. 4 in the first embodiment are denoted by the same step reference numbers, and an explanation thereof will be omitted.

After the processes in steps S401 and S402, if the authentication result indicates "mismatch", the process advances to step S402a to perform notification of promoting the user to perform re-input.

Figure 8:
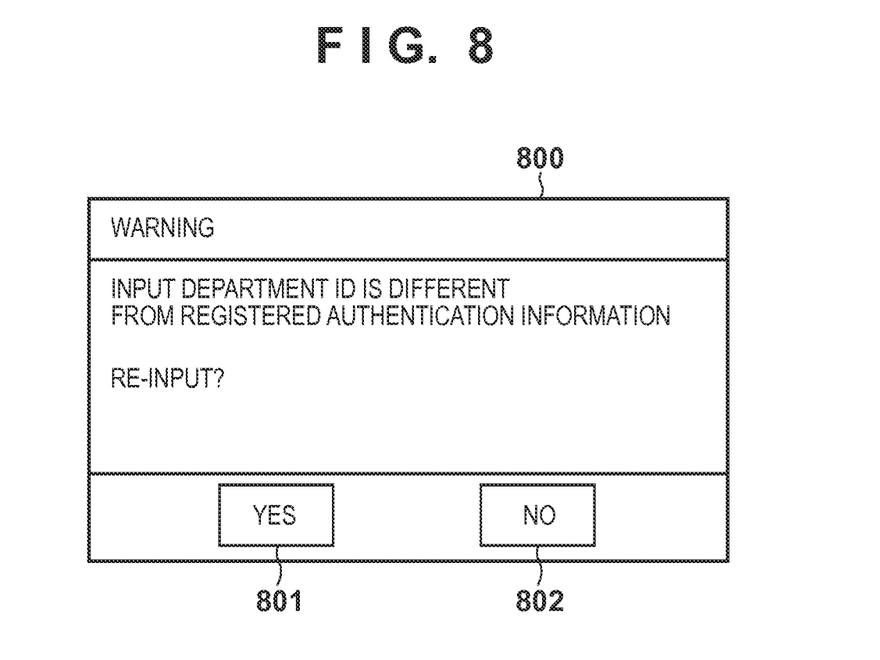
FIG. 8 is a view showing an example of a notification screen which prompts re-input of account information according to the second embodiment.

FIG. 8 is a view showing an example of a notification screen for prompting re-input of the account information according to the second embodiment.

This screen shown in FIG. 8 is displayed on the display 107 of the host apparatus 100, but may also be displayed on the display of the operation panel 131 of the printer 120. Referring to FIG. 8, a re-input confirmation dialogue 800 is displayed in step S402a. This display screen includes a message, "YES" button 801, and "NO" button 802. In accordance with this notification, the user presses the "YES" button 801 when performing re-input, and presses the "NO" button 802 when performing no re-input.

In step S402a, whether or not the user performs re-input is determined by checking whether the "YES" button 801 or "NO" button 802 is pressed. If the user has selected to perform re-input, the process returns to step S401, and the authentication process in step S401 is re-executed based on the re-input account information. On the other hand, if the user has selected to perform no re-input, the process advances to step S403, and the process explained in the first embodiment is executed.

Note that the screen shown in FIG. 8 may also display the department ID input by the user. In this case, if the user inputs the department ID already registered in the account registered information by mistake, it is possible to prevent update from being performed by the incorrect department ID.

Third Embodiment

Figure 9:
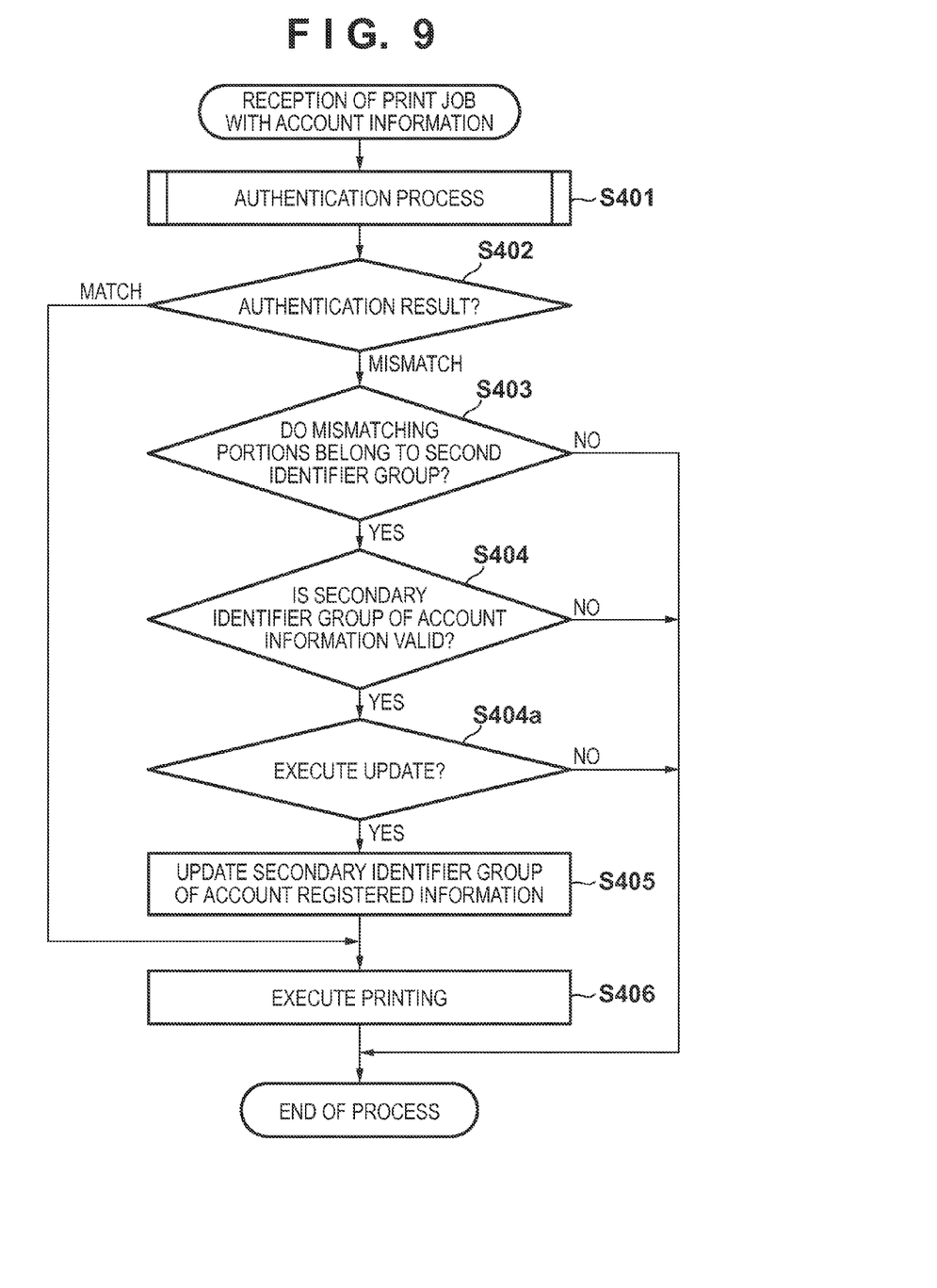
FIG. 9 is a flowchart showing an account registered information updating process according to the third embodiment.

FIG. 9 is a flowchart showing an account registered information updating process according to the third embodiment.

Note that in FIG. 9, the same processing steps as already explained with reference to FIG. 4 in the first embodiment are denoted by the same step reference numbers, and an explanation thereof will be omitted.

After the processes in steps S401 to S403, if it is determined in step S404 that the secondary identifier group of the account information is found to have a valid value, the process advances to step S404a to inquire of the user whether to update the account registered information.

Figure 10:
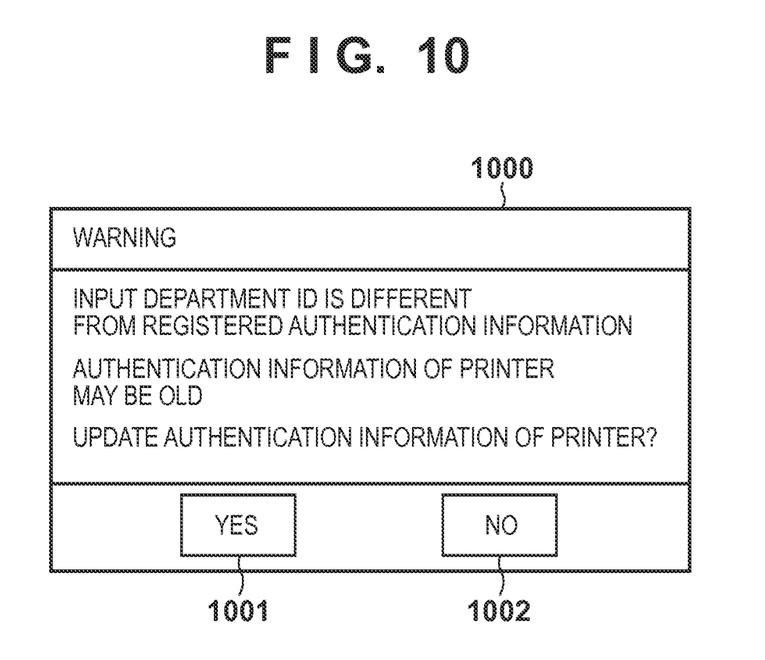
FIG. 10 is a view showing a notification screen for inquiring of a user whether to update account registered information.

FIG. 10 is a view showing an example of a notification screen for inquiring of the user whether to update the account registered information according to the third embodiment. This screen shown in FIG. 10 is displayed on the display 107 of the host apparatus 100, but may also be displayed on the display of the operation panel 131 of the printer 120.

Referring to FIG. 10, an account registered information update confirmation dialogue 1000 is displayed in step S404a. This display screen includes a message, "YES" button 1001, and "NO" button 1002. In accordance with this confirmation message, the user determines whether to update the account registered information. Then, the user presses the "YES" button 1001 when executing update, and presses the "NO" button 1002 when executing no update.

If the user selects the execution of update as a response to the confirmation in step S404a, the process advances to step S405; if not, the process is immediately terminated.

In the first to third embodiments explained above, therefore, the secondary identifier group updatable by a user is provided in authenticated printing. This makes it possible to reduce the complicated account registered information updating work by the administrator, and reduce situations in which the user cannot execute printing.

Also, it is possible to selectively use a printer having a high security and a printer given an accounting function by changing the settings of the secondary identifier group for each printer.

Note that if the account registered information is updated in step S405 of FIGS. 4, 7, and 9 described above, it is also possible to notify the administrator of this update. Alternatively, an account registered information update log may also be stored in the HDD 128 or in an external storage medium accessible by the printer 120.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-264496, filed Dec. 20, 2013, which is hereby incorporated by reference herein in its entirety.

What is claimed is:

1. A printing system comprising a host apparatus which transmits to a printing apparatus: a print job and account information including a password, a personal identifier, and an affiliation identifier, which are input by a user to the host apparatus, and the printing apparatus which is connected to the host apparatus, receives the print job and the account information, and performs authenticated printing, wherein the printing apparatus comprises:

a storage unit configured to store account information including a password, a personal identifier, and an affiliation identifier for each user input by an administrator of the printing system beforehand;

a processor configured to:

authenticate the user by comparing the account information transmitted by the host apparatus with the account information in the storage unit;

execute printing based on the print job in a first case where it is determined by authentication by the authentication unit that: even though all of the account information transmitted by the host apparatus do not match with all of the account information stored in the storage unit for a first user, (1) the password and the personal identifier transmitted by the host apparatus and the password and the personal identifier stored in the storage unit for the first user match; (2) the affiliation identifier transmitted by the host apparatus and the affiliation identifier stored in the storage unit for the first user do not match; and (3) the affiliation identifier transmitted by the host apparatus has been stored in the storage unit for a second user; and suppress the printing in a second case where it is determined by authentication by the authentication unit that the password and the personal identifier transmitted by the host apparatus and the password and the personal identifier stored in the storage unit for the first user match, and the affiliation identifier transmitted by the host apparatus has not been stored for any user.

2. The printing system according to claim 1, wherein in the first, the processor executes the printing without input of the affiliation identifier which has been stored in the storage unit for the first user.

3. The printing system according to claim 1, wherein the host apparatus comprises:

a display unit configured to display, before the printing executed by the processor in the first case, a message prompting the user to re-input an affiliation identifier; and an input unit configured to input the affiliation identifier again in accordance with an instruction by the user for responding to the message displayed by the display unit, wherein even if the input unit does not input the affiliation identifier again, the processor executes the printing in accordance with an instruction by the user.

4. The printing system according to claim 3, wherein the display unit is further configured to display a message for making an inquiry of the user, before the printing by the processor, and the input unit is further configured to input a response to the message for making an inquiry of the user, in a case where the input unit inputs an affiliation identifier as the response, the processor further authenticates using the input affiliation identifier, and in a case where the input unit inputs an instruction indicating no input of the affiliation identifier as the response, the processor executes the printing.

5. The printing system according to claim 1, wherein the processor further updates the affiliation identifier stored in the storage unit with the affiliation identifier transmitted by the host apparatus in the first case.

6. The printing system according to claim 1, wherein the affiliation identifier is a department-ID.

7. A printing apparatus which receives: a print job; and account information including a password, a personal identifier, and an affiliation identifier, which are input by a user to a host apparatus, transmitted from a host apparatus, and performs authenticated printing, comprising:
- a storage unit configured to store account information including a password, a personal identifier, and an affiliation identifier for each user input beforehand by an administrator of a printing system including the host apparatus and the printing apparatus;
- a processor configured to:
- authenticate the user by comparing the account information transmitted by the host apparatus with the account information stored in the storage unit;
- execute printing based on the print job in a first case where it is determined by authentication by the authentication unit that: even though all of the account information transmitted by the host apparatus do not match with all of the account information stored in the storage unit for a first user, (1) the password and the personal identifier transmitted by the host apparatus and the password and the personal identifier stored in the storage unit for the first user match; (2) the affiliation identifier transmitted by the host apparatus and the affiliation identifier stored in the storage unit for the first user do not match; and (3) the affiliation identifier transmitted by the host apparatus has been stored in the storage unit for the second user; and
- suppress the printing in a second case where it is determined by authentication by the authentication unit that the password and the personal identifier transmitted by the host apparatus and the password and the personal identifier stored in the storage unit for the first user match, and the affiliation identifier stored in the storage unit has not been stored for any user.

8. The printing apparatus according to claim 7, in the first case, the processor executes the printing without input of the affiliation identifier which has been stored in the storage unit for the first user.

9. The printing apparatus according to claim 7, wherein the processor suppresses printing, in a case where it is determined by authentication by the processor that the personal identifier or the password transmitted by the host apparatus has not been stored for any user.

10. The printing apparatus according to claim 7, wherein the processor executes the printing by a printer engine configured to perform printing in accordance with an inkjet method.

11. The printing apparatus according to claim 7, wherein
the password and the personal identifier stored in the storage unit is updatable by the administrator of the printing system, and
the affiliation identifier stored in the storage unit is updatable by the administrator of the printing system and the user.

12. The printing apparatus according to claim 7, wherein the processor further updates the affiliation identifier stored in the storage unit with the affiliation identifier transmitted by the host apparatus in the first case.

13. The printing apparatus according to claim 12, wherein even in the first case, the processor suppresses the printing, in a case where the user inputs determination indicating no update when the user is inquired before the printing about whether or not to perform update before the update is performed by the processor.

14. The printing apparatus according to claim 7 wherein the affiliation identifier is a department-ID.

15. A control method executed by a processor of a printing apparatus which receives: a print job; and account information including a password, a personal identifier, and an affiliation identifier, which are input by a user to a host apparatus, transmitted from the host apparatus, and performs authenticated printing, comprising:
- storing, in a storage unit, account information including a password, a personal identifier and an affiliation identifier for each user input beforehand by an administrator of a printing system including the host apparatus and the printing apparatus;
- authenticating the user by comparing the account information transmitted by the host apparatus with the account information stored in the storage unit; and
- in a first case where it is determined by the authenticating that: even though all of the account information transmitted by the host apparatus do not match with all of the account information stored in the storage unit for a first user, (1) the password and the personal identifier transmitted by the host apparatus and the password and the personal identifier stored in the storage unit for the first user match; (2) the affiliation identifier transmitted by the host apparatus and the affiliation identifier stored in the storage unit for the first user do not match; and (3) the affiliation identifier transmitted by the host apparatus has been stored in the storage unit for a second user, printing based on the print job; and
- in a second case where it is determined by the authenticating that the password and the personal identifier transmitted by the host apparatus and the password and the personal identifier stored in the storage unit for the first user match, and the affiliation identifier stored in the storage unit has not been stored for any user, suppressing the printing.

16. The control method according to claim 15, further comprising in the first case, executing the printing without input of the affiliation identifier which has been stored in the storage unit for any user.

17. The control method according to claim 15, further comprising suppressing printing, in a case where it is determined by the authenticating that the personal identifier or the password transmitted by the host apparatus has not been stored for any user.

18. The control method according to claim 15, wherein
the password and the personal identifier stored in the storage unit is updatable by the administrator of the printing system, and
the affiliation identifier stored in the storage unit is updatable by the administrator of the printing system and the user.

19. The control method according to claim 15, further comprising updating the affiliation identifier stored in the storage unit with the affiliation identifier transmitted by the host apparatus in the first case.

20. The control method according to claim 19, further comprising suppressing printing, in a case where the user inputs determination indicating no update when the user is inquired before the printing about whether or not to perform update before the update is performed.

21. The control method according to claim 15, wherein the affiliation identifier is a department-ID.

22. A non-transitory computer readable storage which stores a computer program to be executed in a processor of a printing apparatus which is capable of receiving: a print job; and account information including a password, a personal identifier and an affiliation identifier, which are input by a user to a host apparatus, transmitted from the host apparatus, and performing authenticated printing, the program comprising:
   storing, in a storage unit, account information including a password, a personal identifier and an affiliation identifier for each user input beforehand by an administrator of a printing system including the host apparatus and the printing apparatus;
   authenticating the user by comparing the account information transmitted by the host apparatus with the account information stored in the storage unit; and
   in a first case where it is determined by the authenticating that: even though all of the account information transmitted by the host apparatus do not match with all of the account information stored in the storage unit for a first user, (1) the password and the personal identifier transmitted by the host apparatus and the password and the per personal identifier stored in the storage unit for the first user match; (2) the affiliation identifier transmitted by the host apparatus and the affiliation identifier stored in the storage unit for the first user do not match; and (3) the affiliation identifier transmitted by the host apparatus has been stored in the storage unit for a second user, printing based on the print job; and
   in a second case where it is determined by the authenticating that the password and the personal identifier transmitted by the host apparatus and the password and the personal identifier stored in the storage unit for the first user match, and the affiliation identifier stored in the storage unit has not been stored for any user, suppressing the printing.

23. The non-transitory computer readable storage according to claim 22, wherein the program further comprises updating the affiliation identifier stored in the storage unit with the affiliation identifier transmitted by the host apparatus in the first case.

24. The non-transitory computer readable storage according to claim 22, wherein the affiliation identifier is a department-ID.

\* \* \* \* \*